United States Patent
Sahoo et al.

(10) Patent No.: US 10,091,135 B2
(45) Date of Patent: *Oct. 2, 2018

(54) SYSTEM AND METHOD FOR MULTI-TENANCY ENABLEMENT OF ENTERPRISE JAVA APPLICATIONS USING RESOURCE PROXIES AND APPLICATION TENANCY CONTEXT

(71) Applicant: Oracle International Corporation, Redwood Shores, CA (US)

(72) Inventors: Sanjeeb Sahoo, Cupertino, CA (US); Sivakumar Thyagarajan, Bangalore (IN); Jagadish Ramu, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/973,052

(22) Filed: Dec. 17, 2015

(65) Prior Publication Data
US 2016/0142506 A1    May 19, 2016

Related U.S. Application Data

(63) Continuation-in-part of application No. 14/866,642, filed on Sep. 25, 2015.
(Continued)

(51) Int. Cl.
*H04L 12/911* (2013.01)
*H04L 29/08* (2006.01)
*G06F 9/46* (2006.01)

(52) U.S. Cl.
CPC ............. *H04L 47/828* (2013.01); *G06F 9/46* (2013.01); *H04L 67/2804* (2013.01); *H04L 67/2833* (2013.01); *H04L 67/2838* (2013.01)

(58) Field of Classification Search
CPC ............. H04L 67/2804; H04L 67/2838; H04L 67/2833; H04L 67/10; H04L 47/828;
(Continued)

(56) References Cited

U.S. PATENT DOCUMENTS

| 2006/0036715 A1* | 2/2006 | Ghattu | H04L 67/125 |
| | | | 709/220 |
| 2007/0067435 A1* | 3/2007 | Landis | G06F 9/5016 |
| | | | 709/224 |

(Continued)

OTHER PUBLICATIONS

United States Patent and Trademark Office, Notice of Allowance dated Apr. 11, 2018 for U.S. Appl. No. 14/866,642, 13 Pages.

*Primary Examiner* — Michael C Lai
(74) *Attorney, Agent, or Firm* — Tucker Ellis LLP

(57) ABSTRACT

In accordance with an embodiment, described herein is a system and method for multi-tenancy enablement of enterprise Java™ applications using resource proxies and application tenancy context. In accordance with an embodiment, the system and method can provide a plurality of deployable resources which can be used within the application server environment, and one or more application deployments, wherein each application deployment includes at least one of tenant-specific code and shared-tenant code. The system and method can further determine an application tenancy context of a thread, and point to one or more resource proxies, each of the one or more resource proxies being configurable to communicate with a tenant specific resource. Each of the one or more resource proxies can use the application tenancy context of a thread to communicate with a tenant specific resource.

20 Claims, 9 Drawing Sheets

Related U.S. Application Data

(60) Provisional application No. 62/055,912, filed on Sep. 26, 2014.

(58) Field of Classification Search
CPC ........ G06F 9/455; G06F 9/45504; G06F 9/46; G06F 9/50; G06F 8/60
USPC .......................................................... 709/226
See application file for complete search history.

(56) References Cited

U.S. PATENT DOCUMENTS

| | | | |
|---|---|---|---|
| 2011/0213870 A1* | 9/2011 | Cai | H04L 67/10 709/223 |
| 2013/0104150 A1* | 4/2013 | Rdzak | G06F 9/54 719/328 |
| 2013/0297801 A1* | 11/2013 | Guest | H04L 47/827 709/226 |
| 2014/0359113 A1* | 12/2014 | Krebs | H04L 41/5009 709/224 |
| 2015/0207758 A1 | 7/2015 | Mordani et al. | |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

* cited by examiner

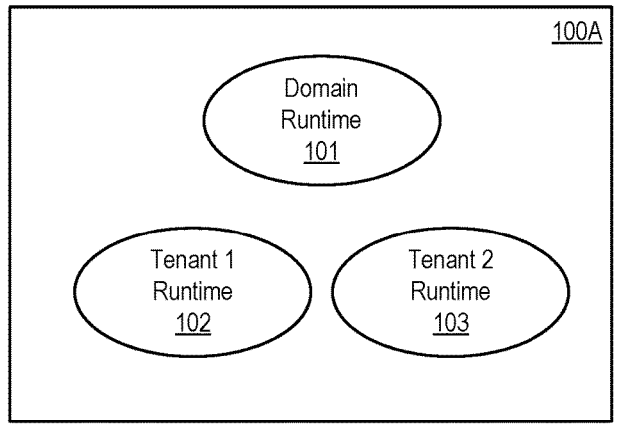
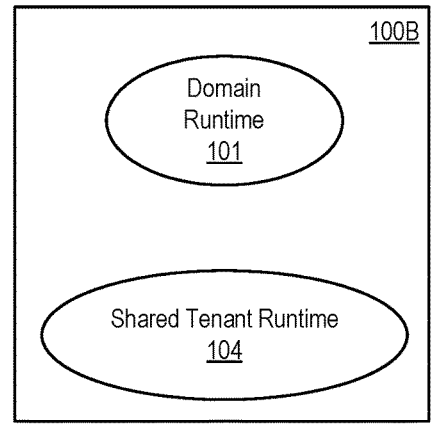
FIGURE 1A
FIGURE 1B
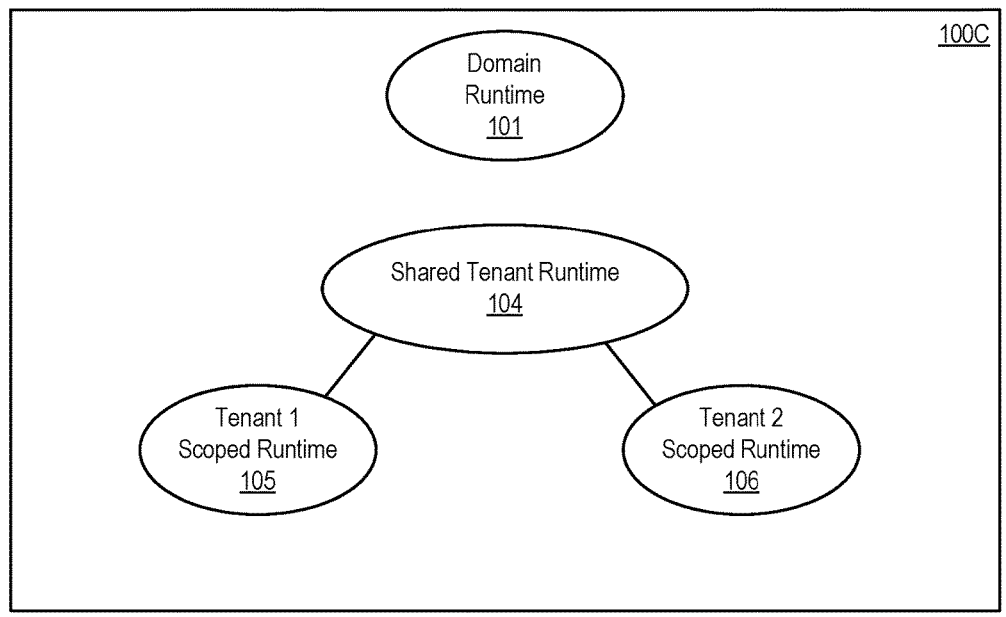
FIGURE 1C

SYSTEM AND METHOD FOR MULTI-TENANCY ENABLEMENT OF ENTERPRISE JAVA APPLICATIONS USING RESOURCE PROXIES AND APPLICATION TENANCY CONTEXT

CROSS-REFERENCE TO RELATED APPLICATIONS

This application is a continuation-in-part of U.S. Patent Application titled "SYSTEM AND METHOD FOR MULTI-TENANCY ENABLEMENT OF ENTERPRISE JAVA APPLICATIONS USING RESOURCE PROXIES AND APPLICATION TENANCY CONTEXT", application Ser. No. 14/866,642, filed Sep. 25, 2015, which claims benefit of priority to U.S. Provisional Application titled "SYSTEM AND METHOD FOR MULTI-TENANCY ENABLEMENT OF ENTERPRISE JAVA APPLICATIONS USING RESOURCE PROXIES AND APPLICATION TENANCY CONTEXT", Application No. 62/055,912, filed Sep. 26, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; which applications are herein incorporated by reference.

FIELD OF INVENTION

Embodiments of the invention are generally related to application servers and cloud environments, and are particularly related to a system and method for use of resource proxies in an application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, which can lead to redundancy in code when multiple tenants utilize the same applications.

SUMMARY

In accordance with an embodiment, described herein is a system and method for multi-tenancy enablement of enterprise Java™ applications using resource proxies and application tenancy context. In according with an embodiment, the system and method can provide a plurality of deployable resources which can be used within the application server environment, and one or more application deployments, wherein each application deployment includes at least one of tenant-specific code and shared-tenant code. The system and method can further determine an application tenancy context of a thread, and point to one or more resource proxies, each of the one or more resource proxies being configurable to communicate with a tenant specific resource. Each of the one or more resource proxies can use the application tenancy context of a thread to communicate with a tenant specific resource.

In accordance with an embodiment, described herein is a system and method for multi-tenancy enablement of enterprise Java™ applications using resource proxies and application tenancy context. In accordance with an embodiment, the system makes it possible to realize a shared tenant runtime by allowing a single Java™ EE application instance to serve multiple tenants. It also supports tenant scoped runtimes to support tenant specific customizations by allowing separate instantiation of tenant specific customizations to application logic. A shared Java™ EE application instance accesses external resources using resource proxies. The resource proxies can be configured by the deployer to communicate with a shared resource or a tenant specific resource. The use of resource proxies is completely transparent to the shared Java™ EE application instance. In situations where inter-tenant isolation needs are more important than benefits gained out of sharing, this technique allows a SaaS provider to instantiate the entire application separately for a tenant, and configure the application to use tenant specific resources directly. In accordance with an embodiment, resource proxies use the application tenancy context of the thread to communicate with a tenant specific resource. Actual resources can be configured, managed, and monitored on a per-tenant basis. The resource proxy technique works well for a variety of resources such as JMS, JDBC, and Web Services; and allows underlying resources to participate in XA transactions in case of server failure.

BRIEF DESCRIPTION OF THE FIGURES

FIG. 1A is a block diagram depicting a runtime environment, according to an embodiment.

FIG. 1B is a block diagram depicting a runtime environment, according to an embodiment.

FIG. 1C is a block diagram depicting a runtime environment, according to an embodiment.

DETAILED DESCRIPTION

Figure 2:
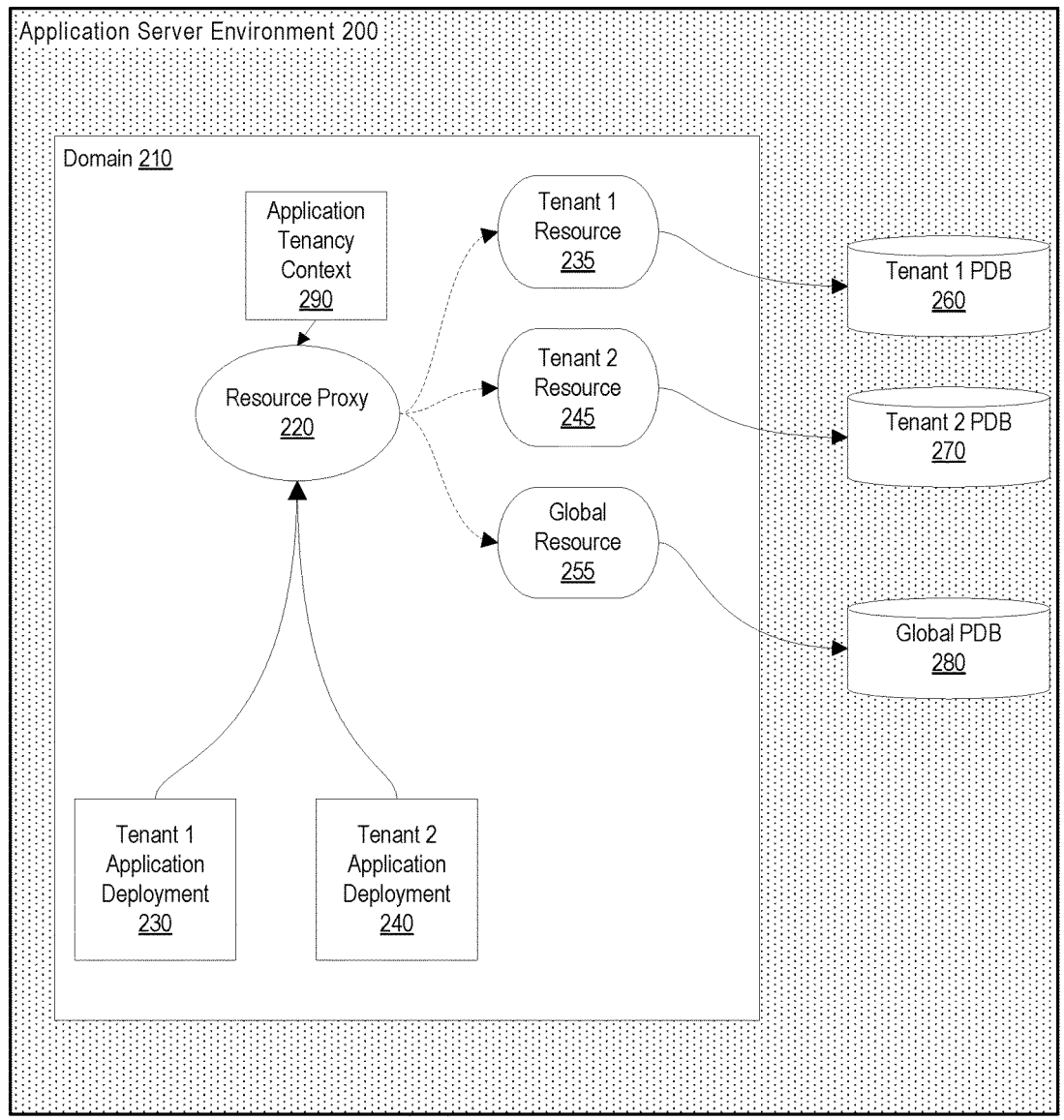
FIG. 2 depicts a runtime view of a server environment where a multi-tenant application has been deployed, according to an embodiment

In accordance with an embodiment, described herein is a system and method for multi-tenancy enablement of enterprise Java™ applications using resource proxies and application tenancy context. In accordance with an embodiment, the system and method can provide a plurality of deployable resources which can be used within the application server environment, and one or more application deployments, wherein each application deployment includes at least one of tenant-specific code and shared-tenant code. The system and method can further determine an application tenancy context of a thread, and point to one or more resource proxies, each of the one or more resource proxies being configurable to communicate with a tenant specific resource. Each of the one or more resource proxies can use the application tenancy context of a thread to communicate with a tenant specific resource.

In accordance with an embodiment, the methods and systems described herein in the context of a multi-tenant operating environment can also be used within a non-multi-tenant operating environment, as described below in the example wherein a servlet calls an EJB container.

Use of Resource Proxies and Application Tenancy Context

In accordance with an embodiment, a system and method for multi-tenancy enablement of enterprise Java™ applications using resource proxies and application tenancy context is provided.

In accordance with an embodiment, the following terms can be used when describing or explaining methods and systems for multi-tenancy enablement of enterprise Java™ applications using resource proxies and application tenancy.

The term tenancy can mean the right to use such a system that belongs to another entity, in accordance with an embodiment. Tenancy can be obtained, for example, for a limited duration by a tenant and it allows a tenant to customize a behavior of the system to a certain extent to suit the tenant's needs.

In an embodiment, the term tenant means a user, users, or one who obtains to right to use certain structures, software, modules and runtime within a multi-tenant system. Additionally, the term tenant can also mean a user, users, or one who obtains to right to use certain structures, software, modules and runtime within a multi-tenant system, e.g., a WebLogic Server (WLS) domain that allows multiple tenants but does not strictly partition off the domain for multiple tenants. For example, a tenant within a multi-tenant WLS domain can be a partition.

In accordance with an embodiment, the terms system provider, system owner, or system vendor can mean one who hosts a system for use by tenants. In turn, the terms system provider, system owner, or system vendor is, in an embodiment, can be further defined as an entity that grants system rights/privileges to tenants.

In accordance with an embodiment, the term single-tenant system can mean a system where only one tenant is able to obtain a right to utilize the system.

In accordance with an embodiment, the term multi-tenant system means a system where more than one tenant is able to obtain the rights to utilize the system.

In accordance with an embodiment, the term tenancy context means contextual information that is used to determine a tenancy of a system. For example, there are many different types of information that make up the context of execution of a system, e.g., security, transaction, location (as in which, e.g., data center, building, host, partition), naming, class loading, and the like. A system can use some of these contextual information types to determine the tenancy/tenancy context of the system. A system can use tenancy context to provide tenant specific behavior, generate bills, etc.

In accordance with an embodiment, the term application tenancy means the right to use an application as determined by the application software.

In accordance with an embodiment, the term domain code (also referred to herein as admin code and multi-tenant ("MT") admin code) means code and/or software that can be deployed and activated before any tenant is on-boarded for a given system. Domain code can be responsible for lifecycle management of the system as well as tenant runtimes.

Organization in Multi-Tenant Software

In accordance with an embodiment, a product or service is said to be multi-tenant when a single instance of the product or service can support more than one tenant or customer-organization. A multi-tenant software product's lifecycle and organization is therefore different from a single-tenant software product in that, for example, the multi-tenant instance's life cycle is greater than any tenant's life cycle. For example, within a multi-tenant context, the multi-tenant software product instance is running when there is no tenant on-boarded, and even before there is a tenant to be on-boarded. Conversely, a single-tenant software product instance's lifecycle can be tied directly to the tenant that it supports. As such, a single tenant software instance typically would not be running before the tenant is available.

Domain Code

In accordance with an embodiment, a multi-tenant software product can have clearly demarcated code which can be separately deployed and activated before any tenant is on-boarded (i.e., domain code). When executed, the runtime representation of the domain code is the domain runtime.

In accordance with an embodiment, the domain code can be responsible for bootstrapping an entire MT product instance. The domain code can also handle the on-boarding of tenants (e.g., when tenants are incorporated into the domain code). The domain code also manages the tenant life cycle management, as well as various system level administration activities of the MT product instance.

In accordance with an embodiment, domain code can be present even in a single-tenant software. For example, a state managed by the domain code can include global application metadata about a product as well as information about various tenants, including details about the tenants' runtimes.

Tenant Code

In accordance with an embodiment, other code in the product, which serves to provide a tenant-specific view of the software, can be referred to as tenant code. The runtime associated with the portion of the software code referred to as tenant code is correspondingly referred to as tenant runtime.

In an embodiment of the present disclosure the domain runtime sets up tenant runtime for new tenants that are on-boarded in the MT product. Each tenant runtime has its own tenant state which is a combination of tenant-specific transient and persistent state. Tenant state includes customized application metadata and configuration for the tenant, transactional data belonging to a tenant.

Shared Tenant Code

In accordance with an embodiment, in situations where the tenant code is not realized in runtime for each tenant separately (e.g., the tenant code is too large to be realized in runtime for every tenant separately), parts of the tenant code can be shared. In situations where each new tenant on-boarded into a system requires a large amount of tenant code, then this large tenant code has to be replicated for every new tenant runtime created for the new tenant. This is neither cost nor resource effective. Thus, in such situations, the system may make use of shared tenant code.

Additionally, in accordance with an embodiment, systems can attempt to maximize sharing in order to reduce cost and increase efficiency. In such situations, a typical product can ensure that at least some (a larger percentage can lead to increase in efficiency) tenant runtimes are designed to have similar characteristics (e.g., same libraries, code and metadata).

Thus, in accordance with an embodiment, a product can break up the tenant code into at least two parts. A first portion of the code can be shared among multiple tenants. As already indicated, this portion of the code that is shared among multiple tenants can be referred to as shared tenant code. A second portion of the code can remain specific to each tenant. Again, as already mentioned, this portion of the code is referred to as tenant code. Once allotted to a tenant, the tenant code is said to be tenant scoped (e.g., tenant scoped runtime).

In accordance with an embodiment, a runtime representation of the parts of the tenant code that are shared among the tenants (i.e., the shared tenant code) is called the shared tenant runtime. The runtime representation of the tenant code that exists solely for a tenant is called the tenant runtime (also referred to herein as tenant scoped runtime).

In accordance with an embodiment, the shared tenant runtime can access the tenant states in the system. To serve any particular tenant, the shared tenant runtime can select the appropriate tenant state while serving the tenant. In order to do so, the shared tenant runtime can identify the tenant for which the current request is being processed. The shared tenant code in a shared tenant runtime can be tenant-aware. In order to provide security to different tenants that share tenant code in a shared tenant runtime, protections can be built into the shared tenant code so as to avoid storing tenant specific details in variables that are accessible to multiple tenants.

In accordance with an embodiment, shared tenant code can represent code that is shared across tenants. Additionally, there is a subset of the shared tenant code that can include static libraries, with the static libraries being tenant-unaware.

In an embodiment, the tenant code can be tenant-unaware. In such a situation, the tenant code is realized in a separate runtime for each tenant, respectively. This provides the benefit of keeping the tenant code simple, but, at the same time, increases the cost of runtime/infrastructure efficiency. The domain runtime ensures that the tenant runtime gets its own copy of the code, e.g., isolated configuration, runtime. Existing single-tenant application code are likely to have been written this way (e.g., tenant-unaware), since the code did not have to be written with concern for more than one tenant.

In accordance with an embodiment, when the shared tenant code and shared tenant runtime concept is supported in a product, then some existing tenant code (that is, code that is tenant-unaware) can be made to be tenant-aware. In such situations, the existing tenant code can further be made to form a portion of the shared tenant code and, additionally, share the shared tenant runtime. This is not to say that the entirety of the tenant code must be made tenant unaware. For example, a portion of the tenant code can remain tenant-unaware and run as part of separate tenant runtimes.

In accordance with an embodiment, the domain runtime can manage the lifecycle of the shared tenant runtime, similar to what the domain runtime does with the tenant runtimes. A shared tenant runtime can be instantiated at least prior to the first access from any tenant runtime that refers to it.

In an embodiment, both the shared tenant runtime and the tenant runtime are invoked in the context of a tenant. Conversely, domain runtime may or may not be invoked in the context of a tenant. Domain runtime can, unlike tenant runtime and shared tenant runtime, be called in the context of no-tenant, and, depending on the semantics of the operation being performed, it can operate on one or more tenant specific persistent states or invoke one or more tenant runtimes.

In an embodiment, within an optimized environment, there may be overlap between shared tenant runtime and domain runtime. This overlap is usually achieved via use of common classes or using common Java™ EE components.

For example, referring now to FIG. 1A, which depicts a runtime environment, according to an embodiment. In FIG. 1A, runtime environment 100A includes a multi-tenant (MT) admin runtime 101 (shown in the figure as domain runtime), as well as tenant 1 runtime 102 and tenant 2 runtime 103. In the depicted embodiment, tenant 1 and tenant 2 do not share runtime within a shared tenant runtime, but are instead each given a separate tenant runtime, respectively. Additionally, each tenant code is tenant unaware. This separate tenant runtime is administered by the domain runtime, which ensures that both tenant 1 and tenant 2 received their own copy of the code. By having the domain runtime administer the respective code to the tenants within the runtime environment 100A, this allows for increases in efficiency of runtime and infrastructure. However, in such situations, because a copy of the code must be distributed to each tenant within the runtime environment 100A, e.g., tenant 1 and tenant 2, it can be desired that the code be relatively simple.

As another example, referring now to FIG. 1B, which depicts a runtime environment, according to an embodiment. In FIG. 1B, runtime environment 100B includes a multi-tenant (MT) admin runtime 101 (shown in the figure as domain runtime), as well shared tenant runtime 104. In the depicted embodiment, each tenant that has been on-boarded into the runtime environment 100B participates with the shared tenant runtime 104. Additionally, in the embodiment shown, no tenant has any tenant runtime as all runtime for each tenant takes place in the shared tenant runtime. The shared tenant runtime 104 is able to access all the tenant states in the system, irrespective of the number of tenants in the environment. To serve any particular tenant, the shared tenant runtime 104 can select the appropriate tenant state while serving the tenant. To do so, the shared tenant runtime can identify the tenant for which the current request is being processed. Thus, the shared tenant code within the shared tenant runtime is tenant-aware. In order to provide security to different tenants that share tenant code in a shared tenant runtime, protections can be built into the shared tenant code so as to avoid storing tenant specific details in variables that are accessible to multiple tenants Referring now to FIG. 1C, which depicts a runtime environment, according to an embodiment. In FIG. 1O, runtime environment 100C which comprises a multi-tenant (MT) admin runtime 101 (shown in the figure as domain runtime), shared tenant runtime 104, tenant 1 scoped runtime 105 and tenant 2 scoped runtime 106. In this embodiment, the domain runtime 101 has broken up the runtimes (as well as the respective codes) into both shared tenant runtime 104, and into two scoped runtimes, one for each tenant, e.g., tenant 1 and tenant 2. In this embodiment, both tenant 1 and tenant 2 have runtimes that are shared between each other, the shared tenant runtime (e.g., tenant aware) 104, as well as their own runtimes, that is the tenant scoped runtimes (e.g., tenant unaware) 105 and 106, respectively. In this manner, the runtime environment can take advantage of the efficiencies that come with the shared tenant runtime

104, as well as maintaining individual tenant runtimes (i.e., the scoped runtimes), tenant 1 scoped runtime 105 and tenant 2 scoped runtime 106.

It should be understood that in the embodiments depicted in FIGS. 1A-1C are merely illustrative, and there should be no implied limitation as to the number of tenants participating in the runtime environments.

Application Tenancy Context

In accordance with an embodiment, it may be cost and/or resource prohibitive if every layer of an application is modified or engineered to become tenant aware (i.e., having shared tenant code and/or shared tenant runtime). Because of this, a few layers of the application can be made tenant-aware, and a system and method can use application tenancy in those layers. At runtime, different slices of the application can be made available for different tenants. When a resource is being accessed (irrespective of the resource being present in the tenant scoped runtime or in the shared tenant runtime), the application tenancy context can be set to the current application tenant on behalf of whom the resource is being accessed. In accordance with an embodiment, an exemplary API to establish and retrieve application tenancy is described below:

```
package weblogic.application.mt; import java.util.concurrent.Callable;
import java.util.concurrent.ExecutionException;
/**
*     The application tenant on whose context a request is being executed is
*     represented as the application tenancy context of the request. This class is
*     used to query as well as change tenancy context. The static #getCurrentTenant
*     method returns the current application tenancy context. The static #executeAs
*     method allows privileged code to switch the application tenancy context
*     before executing some code. To be specific, it only allows switching from
*     GLOBAL tenancy context to a specific tenant's context.
*/
public abstract class ApplicationTenancyContext {
/**
*     Represent ID of the administrative tenant which exists to carry out actions
*     on behalf of all tenants.
*/
public final String GLOBAL_TENANT_ID = "GLOBAL";
/**
*     Controls whether the effect of setting application tenancy will be
*     visible locally (in current thread) or in remote components as well.
*/
public enum PropagationMode {
/**
*        Only propagated along the current thread
*/ LOCAL,
/**
*        Propagates to remote as well as local components
*/ ALL
}
/**
*     Returns the ID of the application tenant on whose behalf the current
*     request is being made. If application tenancy context has not been
*     explicitly set, then this method determines the application tenancy context
*     from platform tenancy context using a partition-to-tenant mapping API.
*     DOMAIN partition is mapped to #GLOBAL_TENANT_ID. A value of null is
*     different from #GLOBAL_TENANT_ID.
*
*     @return the application tenant ID
*/
public static String getCurrentTenant( );
/**
*     Execute the supplied code after switching the application tenancy context
*     to that of the tenant identified by tenantId argument. It restores the
*     application tenancy context to its original value before returning. Using
*     propagationMode argument, caller can decide whether the tenancy context
*     should be propagated to remote components as well as local components or
*     local components only. If the supplied action throws any exception, then
*     that's wrapped in an ExecutionException instance and thrown back.
*
*     If a security manager exists and      then its {@link
*     SecurityManager#checkPermission
*     checkPermission} method is called with a <code>{@link
*     RuntimePermission} ("executeAs."+tenantId)</code> permission.      This may
*     result in a {@link SecurityException} being thrown. Callers can be granted
*     privileges using wild card. This security check is performed even when
*     tenantId is same as value returned by #getCurrentTenant.
*
*     @param tenantId         ID of the application tenant whose tenancy context
*                             is being set
*     @param propagationMode flag to control how tenancy context will be
*                             propagated
*     @param action           The action to be performed
*     @return an action specific value or null if it's a void action.
*     @throws ExecutionException   when the supplied action aborts by throwing
*                                  any exception. Use #getCause to see the
```

```
 *                              underlying exception.
 *      @throws NullPointerException    if either tenantId or action is null
 *      @throws SecurityException       if a security manager exists and its {@link
 *                              SecurityManager#checkPermission
 *                              checkPermission} method denies access to this
 *                              method.
 *      @throws IllegalStateException if the application tenancy context can't be
 *                              switched to the requested value from the
 *                              current value as described earlier.
 */
public static <T> T executeAs(String tenantId,
PropagationMode propagationMode, Callable<T> action) throws
ExecutionException;
}
```

Resource Proxies

In accordance with an embodiment, shared tenant code and domain code do not have a fixed binding to a particular tenant's resource(s). Instead, shared tenant code and domain code can select a tenant specific resource based on the operational context. Since the code desires a fixed reference to a resource, and because not all tenant resources can be pre-provisioned in the system, a resource proxy can be used in order to allow the shared tenant code and domain code to have a "fixed" binding to a tenant's resource (e.g., tenant specific resources), where the resource proxy represents a fixed location that can be populated with tenant specific resources.

For example, in an embodiment, shared tenant code and domain code can have a fixed Java™ Naming and Directory Interface (JNDI) reference to a resource proxy. In turn, the resource proxy selects a particular underlying resource based upon the current tenant context (as determined through, for example, the API described above).

In accordance with an embodiment, a resource proxy can be implemented using the following technique:

A javax.naming.Reference of name given by "jndi-name" is bound in JNDI. Each reference is configured with an "object-type," a "factory-class" and a custom property called "jndi-callback-class-name." This custom property is configured using "Reference.add(RefAddr)" method. The "object-type" determines the type of the resource being accessed, e.g., javax.sql.DataSource. When "jndi-name" look up is made using JNDI API such as javax.naming.Context.lookup(String), JNDI subsystem instantiates the factory-class registered against the jndi-name. The "factory-class" is a subclass of javax.naming.spi.ObjectFactory. JNDI subsystem calls getObjectInstance( ) method of the factory to locate the actual object and return to the caller. A generic factory-class using Java's dynamic proxy utility is further implemented. The getObjectInstance( ) method of the "factory-class" creates a dynamic proxy instance of type "object-type" using java.lang.reflect.Proxy.newProxyInstance( ). Each dynamic proxy instance is associated with a JNDIProxy object, which implements java.lang.reflect.InvocationHandler and intercepts every method called using the dynamic proxy instance. JNDIProxy reflectively loads and instantiates the class configured via "jndi-callback-class-name" property in the Reference object. It expects the class to be of type JNDISwitchingCallback which has a method with signature:

Object getObject(String hostResourceName).

In accordance with an embodiment, JNDIProxy delegates the calls to the result of getObject method. Alternatively, JNDIProxy class can also be coded to use Java's native service discovery mechanism (java.util.ServiceLoader) to look for a service of type "JNDISwitchingCallback.class."

The resource proxy technique described herein is available for a variety of resource types such as Java™ Database Connectivity (JDBC), Java™ Message Service (JMS) (both inbound and outbound), Web Services References, Java™ EE Connector resources, JSR 236 Services, etc. Additionally, the resource proxy described herein also is available in both Java™ SE and Java™ EE environment.

Support for Multi-Tenant Inbound Message Delivery to MDBs

Provided herein is an example, according to an embodiment, of the above description relating to an application server automatically providing a tenant specific resource for outbound communication, based on the operational context of the current request to an application component residing in shared tenant code and domain code. In the case of an inbound JMS message delivery to Message Driven Beans (MDBs), a JMS resource adapter (RA) can be modified as follows: A JMS resource adapter typically performs delivery to JMS MDBs through either of the following two ways:

In a first technique, it can use the standard interfaces for "Concurrent Processing of a Subscription's Messages" (i.e, ServerSession, ServerSessionPool and ConnectionConsumer) that may be optionally implemented by application servers. In a second technique, it may use a synchronous consume on the JMS MessageConsumer.

Each MDB activation can provide information on how a resource adapter can retrieve the messages to deliver to the MDB. In the case of a MDB deployed to a shared tenant or domain runtime, the destinationLookup and connectionFactoryLookup is configured to point to the corresponding resourceProxy JNDI references. If a resource adapter uses the first technique described above, then the resource adapter can create a ConnectionConsumer for every application tenant, for example as shown in this pseudo-code:

```
for (Tenant t: tenants) {
    conConsumer = topicCon.createConnectionConsumer(topicDestinationOfTenantT,
    selectorOfMDB, serverSessionPoolForTenantT, maxMessages);
}
```

By providing a custom ServerSession pool per Tenant, the resource adapter can then associate an incoming message delivery to a particular application tenant. In the ServerSession's MessageListener implementation, prior to delivery of the message to the message endpoint, the resource adapter must establish the Application Tenancy Context using the ApplicationTenancyContext.executeAs( . . . ) API discussed above, so that the delivery of the JMS message to the MDB happens in the context of the application tenant.

If the resource adapter uses the second technique as described above, the resource adapter can create a MessageConsumer per application tenant to the tenant's Destination, and establish the application tenancy context prior to message delivery.

Multi-Tenant Java EE Application within a Non-Multi-Tenant Application Server Environment Referring now to FIG. 2, which depicts a runtime view of a server environment where a multi-tenant application has been deployed, according to an embodiment. FIG. 2 depicts an application server environment 200 (e.g., WLS application server environment) within which a domain 210 contains various runtime application deployments for both tenant 1 and tenant 2. In the present example, both tenant 1 application deployment 230 and tenant 2 application deployment 240 access the tenant 1 pluggable database 260 as well as tenant 2 pluggable database 270, respectively, via the resource proxy 220. Both tenant 1 application deployment 230 and tenant 2 application deployment 240 can contain tenant specific code as well as shared tenant code. In turn, the resource proxy 220 uses the tenancy context 290 (application tenancy context) to determine which resource, either tenant 1 resource 235 or tenant 2 resource 245, to point to.

In accordance with an embodiment, both tenant 1 and tenant 2 application deployments 230 and 240 point to the same resource proxy 220, the application tenancy context 290 determined by the system allows the application to access the correct/current database, for example, either tenant 1 PDB 260 or tenant 2 PDB 270, depending on the application tenancy context 290.

Additionally, before selecting either tenant 1 or tenant 2 with respect to the application tenancy context, both application deployments may point to a global PDB 280, in accordance with an embodiment. This occurs, for example, before either tenant 1 or tenant 2 has been on-boarded into the system, but while both application deployments are running. In such situations, the resource proxy points to the global resource 255, and in turn the application deployments can access the global PDB 280. In turn, the system may return the application deployments to accessing the global PDB 280 if the application tenancy context so determines during or after runtime. Importantly, the application server environment 200 depicted in FIG. 2 can take advantage of commonly available isolation semantics typically found in application servers (e.g., Java EE application servers) in order to keep the runtimes of tenant 1 and tenant 2 separate, if desired.

In an embodiment tenant 1 application deployment 230 and tenant 2 application deployment 240 can represent either tenant code or shared tenant code, as well as the corresponding tenant runtimes and shared tenant runtimes. For example, tenant 1 application deployment 230 and tenant 2 application deployment 240 can represent both the separate tenant 1 and tenant 2 scoped runtimes, as well as, in certain embodiments, shared tenant runtime.

For example, in an embodiment, FIG. 2 can be represented by an Oracle™ WebLogic Server environment where a Java™ EE application has been deployed. In the embodiment depicted by FIG. 2, the Java™ EE runtime can access the databases via the resource proxy, which in turn knows which underlying datasource to use based on application tenancy context. The multi-tenant Java™ EE application (or a legacy Java™ EE application), can additionally provide for the support of tenant scoped runtimes in order to support tenant specific customizations (for example, customizations of applications based upon the tenant databases) by allowing separate instantiation of tenant specific customizations to application logic.

Although the datasources depicted in FIG. 2 are shown as pluggable databases, it is understood that such datasources can additionally or alternatively comprise any suitable datasource.

Figure 3:
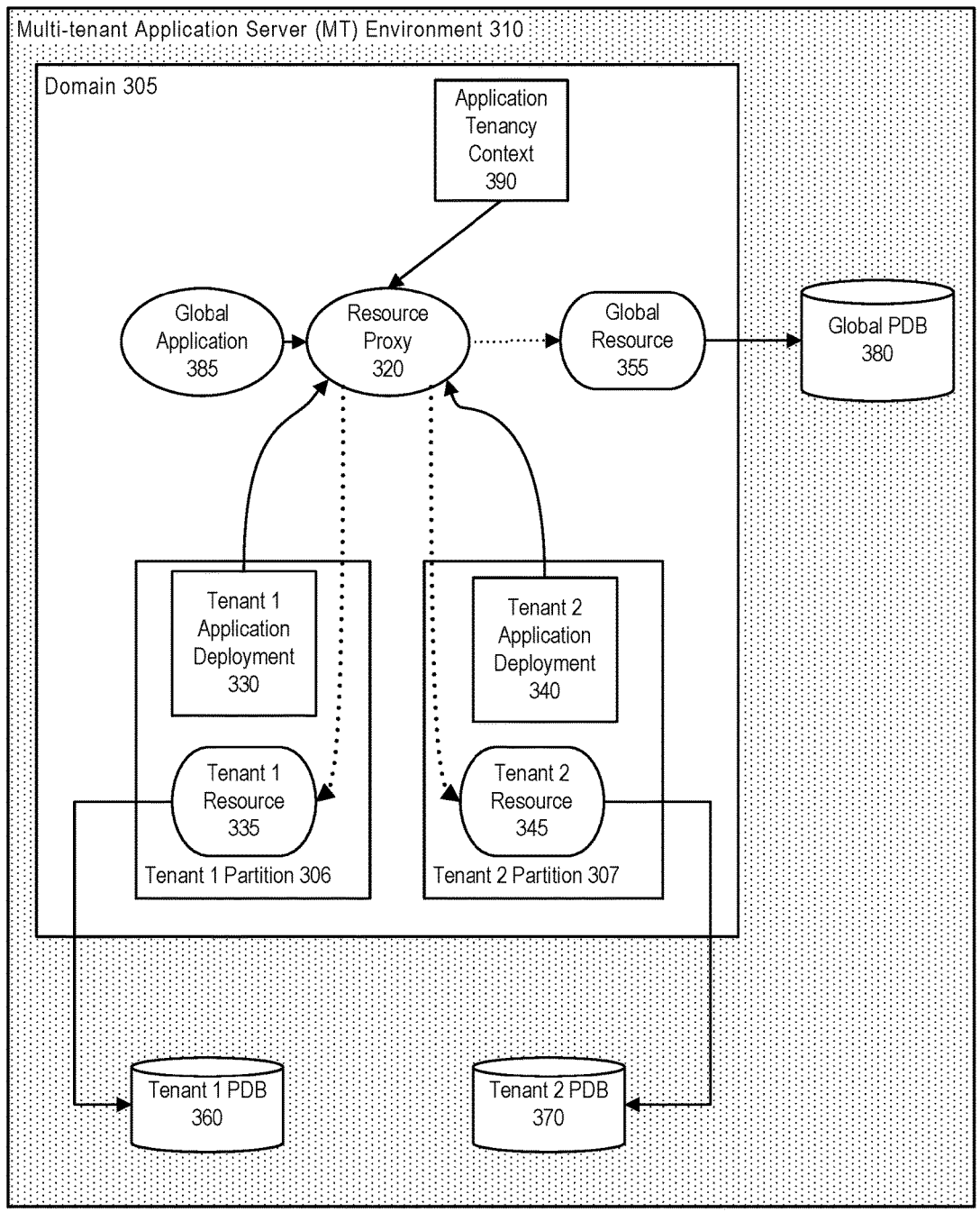
FIG. 3 is a block diagram which depicts a runtime view of a server where a multi-tenant application has been deployed, according to an embodiment.

Multi-Tenant Java EE Application within a Multi-Tenant Application Server Environment Referring now to FIG. 3, which depicts a runtime view of a server where a multi-tenant application has been deployed, according to an embodiment. FIG. 3 depicts a processing environment within which a multi-tenant application server domain 310 (discussed below) contains various runtime application deployments for both tenant 1 and tenant 2, as well as a global application. Multi-tenant application server environment 310 includes, in an embodiment, domain 305, which includes tenant 1 partition 306, and tenant 2 partition 307. Domain 305 also includes global application 385 (or at least a portion of the multi-tenant application that is global), resource proxy 320, and global resource 355, which in turn points to global pluggable database (PDB) 380. Tenant 1 partition 306 includes the tenant 1 application deployment 330 as well as tenant 1 resource 335, which in turn points to tenant 1 pluggable database 360. Tenant 2 partition 307 includes the tenant 2 application deployment 340 as well as tenant 2 resource 345, which in turn points to tenant 2 pluggable database 370.

In accordance with an embodiment, before any tenants are on-boarded, a multi-tenant application, or at least a portion thereof, can be running within the domain 305. In such a situation, the global application 385 (which can include, for example, domain code and shared tenant code) can access the global PDB 380 via the resource proxy 320. The resource proxy 320, in turn, can determine to point to the global resource 355 based upon the application tenancy context 390, which, without any tenants on-boarded, informs the proxy to point to the global resource 355, and in turn the global PDB 380. This, for example, relates to domain runtime, where no tenants have been on-boarded.

In an embodiment, after tenants are on-boarded, e.g., tenant 1 and tenant 2, the application tenancy context 390 can change depending upon the current status of the system. In such a situation, the multi-tenant application deployments for tenants 1 and 2 (which can include, for example, tenant specific code as well as shared tenant code), 330 and 340 respectively, can access tenant 1's PDB 360 and tenant 2's PDB 370 via resource proxy 320. The resource proxy 320, in turn, knows to point to the tenant 1 resource 335 and tenant 2 resource 345 based upon the application tenancy context 390. These tenant resources in turn can allow the multi-tenant application to access tenant 1 PDB 360 and tenant 2 PDB 370. Importantly, the processing environment depicted in FIG. 3 takes advantage of a multi-tenancy environment which can allow for providing shared tenant runtime based upon application tenancy context and resources proxies within a multi-tenant environment in which partitions are established and associated with various tenants for runtime definition.

For example, in an embodiment, FIG. 3 represents an Oracle™ Multitenant WebLogic Server environment where a multi-tenant Java™ EE application has been deployed. In accordance with an embodiment depicted by FIG. 3, the Java™ EE runtime can access the various databases via the resource proxy, which in turn knows which underlying datasource to use based on application tenancy context. The multi-tenant Java™ EE application can additionally provide for the support of tenant scoped runtimes in order to support tenant specific customizations (for example, customizations of applications based upon the tenant databases) by allowing separate instantiation of tenant specific customizations to application logic.

Figure 4:
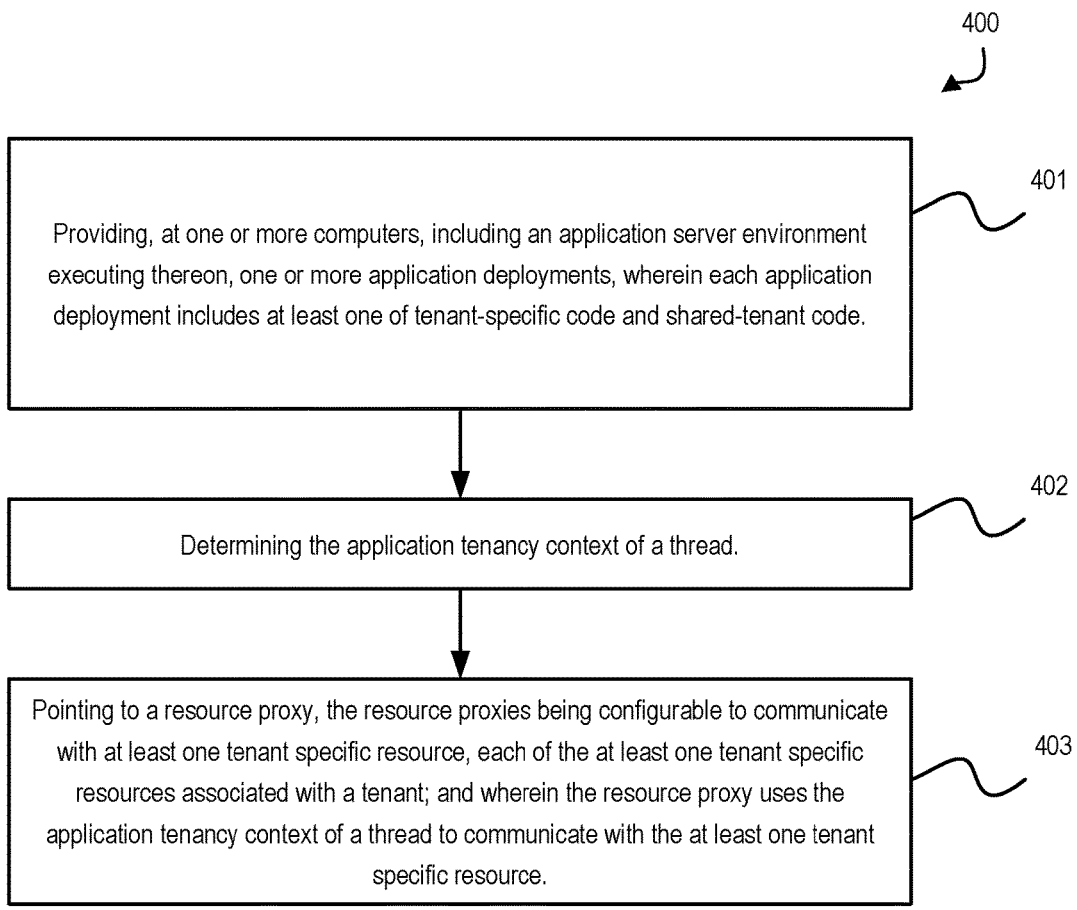
FIG. 4 is a flow chart for depicting an exemplary method for deployment of a multi-tenant application, according to an embodiment.

FIG. 4 illustrates an exemplary flow chart for an exemplary method 400 for deployment of a multi-tenant application. At step 401, the method can begin with providing, at one or more computers, including an application server environment executing thereon, one or more application deployments, wherein each application deployment includes at least one of tenant-specific code and shared-tenant code. The exemplary method 400 can continue at step 402 with determining an application tenancy context of a thread. The exemplary method 400 can proceed at step 403 with pointing to a resource proxy, the resource proxies being configurable to communicate with at least one tenant specific resource, each of the at least one tenant specific resources associated with a tenant; and wherein the resource proxy uses the application tenancy context of a thread to communicate with the at least one tenant specific resource.

Application Server (e.g., Multi-Tenant, MT) Environment

As mention above, the herein described methods and systems for supporting multi-tenancy enablement of applications using resource proxies and application tenancy context can be provided in both non-multitenant application server environments as well as multitenant (MT) application server environments. The following description provides information relating to multitenant application server environments.

Figure 5:
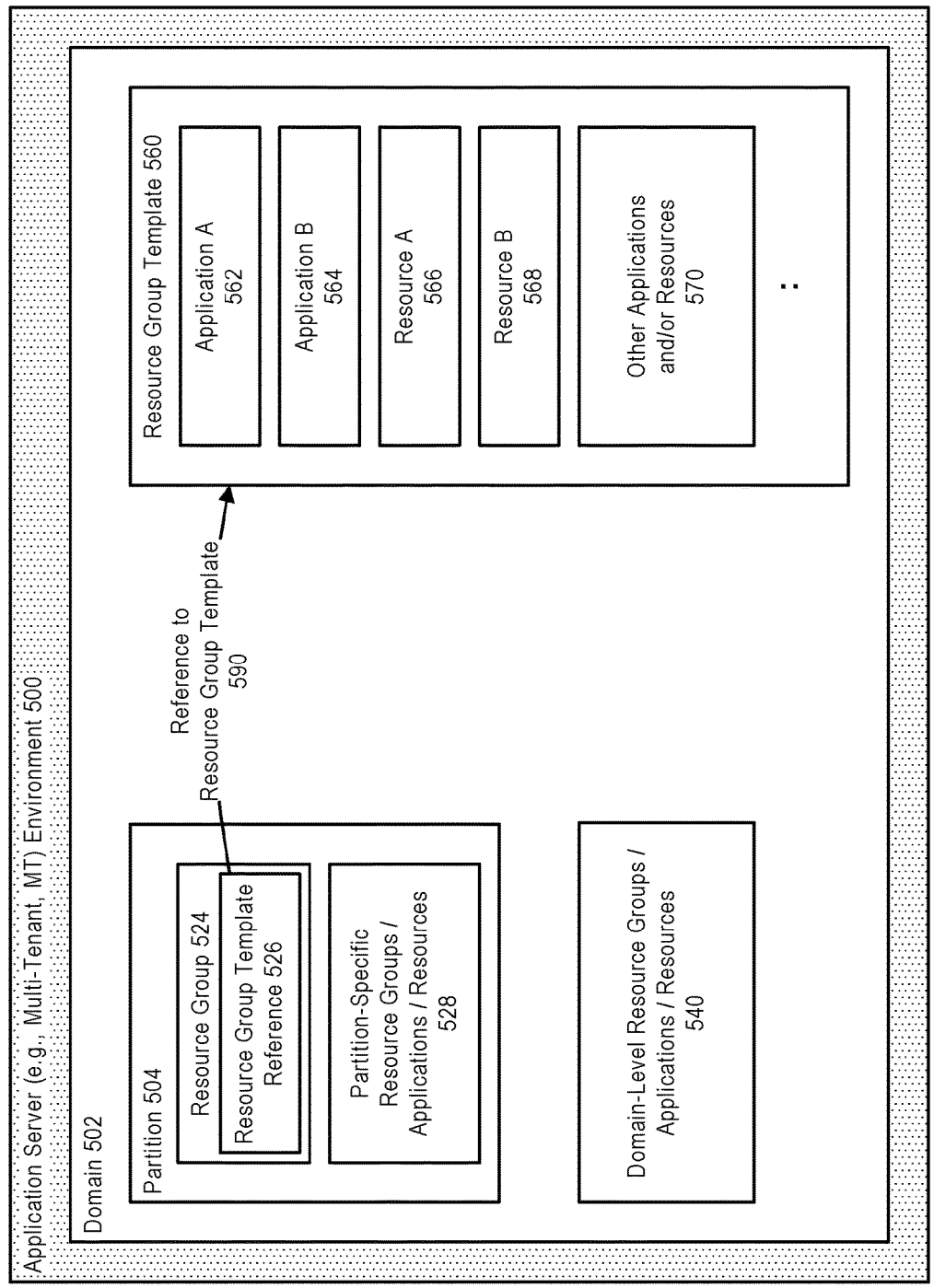
FIG. 5 illustrates a system for supporting multi-tenancy in an application server, cloud, or other environment, in accordance with an embodiment.

FIG. 5 illustrates a system for supporting multi-tenancy in an application server, cloud, or other environment, in accordance with an embodiment.

As illustrated in FIG. 5, in accordance with an embodiment, an application server (e.g., multi-tenant, MT) environment 500, or other computing environment which enables the deployment and execution of software applications, can be configured to include and operate according to a domain 502 configuration that is used at runtime to define an application server domain.

In accordance with an embodiment, the application server can include one or more partitions 504 that are defined for use at runtime. Each partition can be associated with a globally unique partition identifier (ID) and partition configuration, and can further include one or more resource groups 524, together with a reference to a resource group template 526 and/or partition-specific applications or resources 528. Domain-level resource groups, applications and/or resources 540 can also be defined at the domain level, optionally with a reference to a resource group template.

Each resource group template 560 can define one or more applications A 562, B 564, resources A 566, B 568, and/or other deployable applications or resources 570, and can be referenced by a resource group. For example, as illustrated in FIG. 5, resource group 524 in partition 504 can reference 590 resource group template 560.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 6:
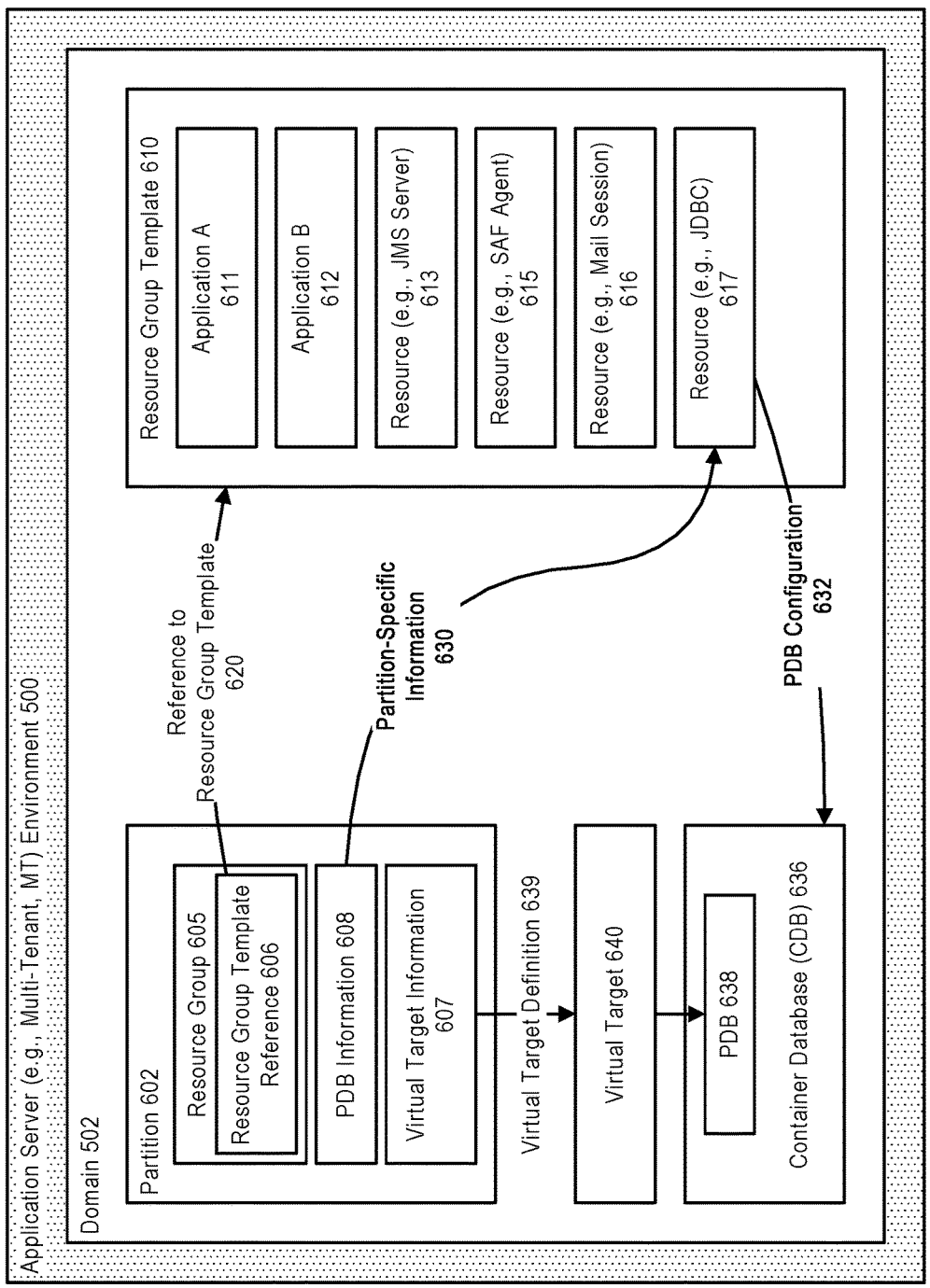
FIG. 6 further illustrates a system for supporting multi-tenancy in an application server, cloud, or other environment, in accordance with an embodiment.

FIG. 6 further illustrates a system for supporting multi-tenancy in a multitenant application server, cloud, or other environment, in accordance with an embodiment.

As illustrated in FIG. 6, in accordance with an embodiment, a partition 602 can include, for example, a resource group 605 which includes a reference 606 to a resource group template 610, a virtual target (e.g., virtual host) information 607, and a pluggable database (PDB) information 608. A resource group template (e.g., 610) can define, for example, a plurality of applications A 611 and B 612, together with resources such as a Java Message Server (JMS) server 613, store-and-forward (SAF) agent 615, mail session component 616, or Java Database Connectivity (JDBC) resource 617.

The resource group template illustrated in FIG. 6 is provided by way of example; in accordance with other embodiments, different types of resource group templates and elements can be provided.

In accordance with an embodiment, when a resource group within a partition (e.g., 602) references 620 a particular resource group template (e.g., 610), information associated with a particular partition can be used in combination with the referenced resource group template, to indicate a partition-specific information 630, for example a partition-specific PDB information. The partition-specific information can then be used by the application server to configure resources, for example a PDB resource, for use by the partition. For example, partition-specific PDB information associated with partition 602 can be used, by the application server, to configure 632 a container database (CDB) 636 with an appropriate PDB 638, for use by that partition.

Similarly, in accordance with an embodiment, a virtual target information associated with a particular partition can be used to define 639 a partition-specific virtual target 640, for use by the partition, e.g., baylandurgentcare.com, which can then be made accessible via a uniform resource locator (URL), e.g., http://baylandurgentcare.com.

Figure 7:
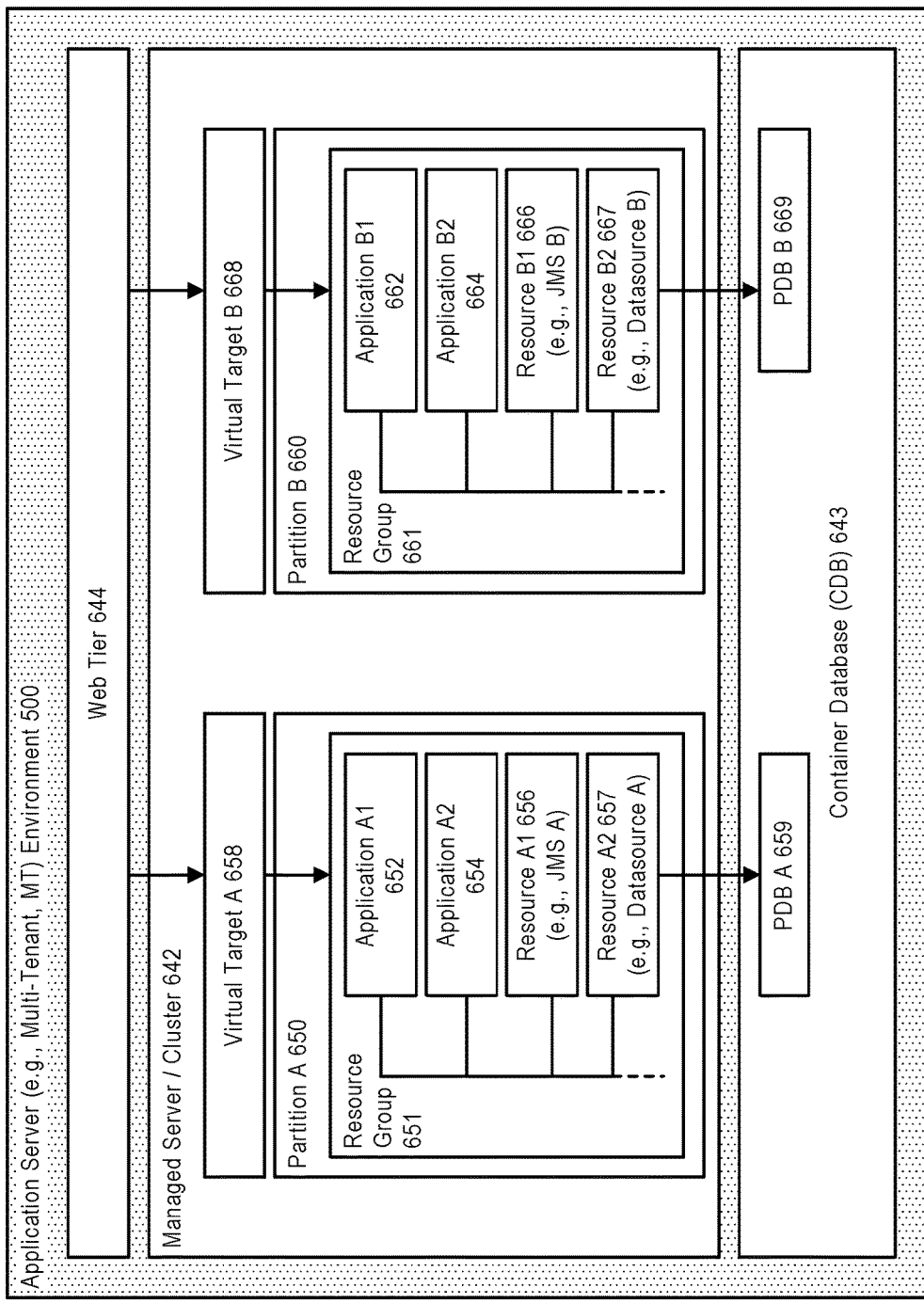
FIG. 7 further illustrates a system for supporting multi-tenancy in an application server, cloud, or other environment, in accordance with an embodiment.

FIG. 7 further illustrates a system for supporting multi-tenancy in a multitenant application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 642, or a similar environment which can provide access to a CDB 643, and which are accessible via a web tier 644. This allows, for example, a domain or partition to be associated with one or more of the PDBs (of the CDB).

In accordance with an embodiment, each of the plurality of partitions, in this example partition A 650 and partition B 660, can be configured to include a plurality of resources associated with that partition. For example, partition A can be configured to include a resource group 651 which contains an application A1 652, application A2 654, and JMS A 656, together with a datasource A 657 associated with PDB A 659, wherein the partition is accessible via a virtual target A 658. Similarly, partition B 660 can be configured to include a resource group 661 which contains an application B1 662, application B2 664, and JMS B 666, together with a datasource B 667 associated with PDB B 669, wherein the partition is accessible via a virtual target B 668.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource can be a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${C RM Data Username}.

Tenants

In accordance with an embodiment, in a multi-tenant environment, such as a multi-tenant (MT) application server environment, a tenant is an entity that can be represented by a partition.

For example, user organizations of a multitenant application server environment can comprise multiple entities, such as different external companies, or different departments within a particular enterprise (e.g., HR and Finance departments), each of which can be associated with a different partition (and thus a different tenant).

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 8:
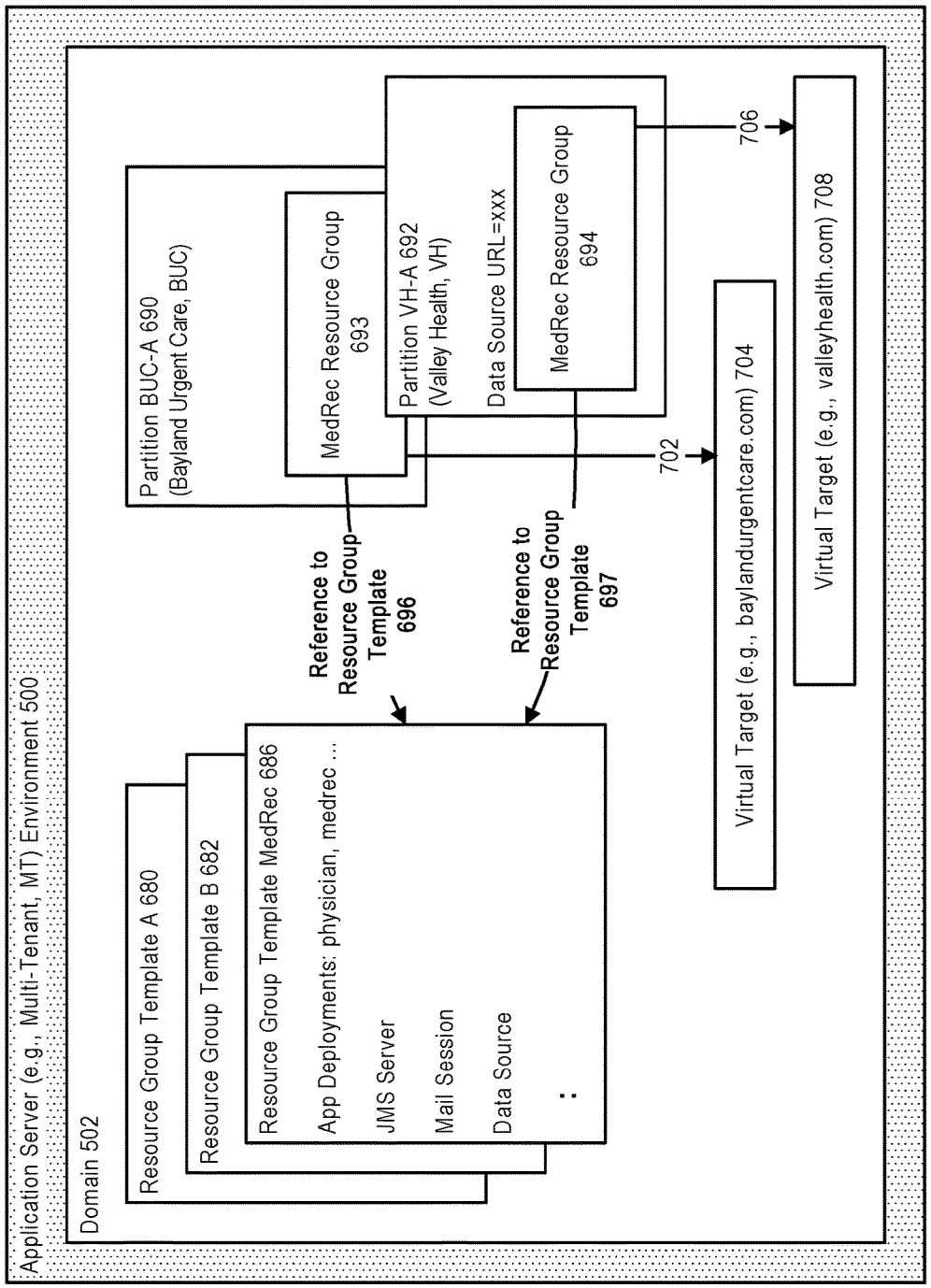
FIG. 8 illustrates a domain configuration for use with an exemplary multi-tenant environment, in accordance with an embodiment.

FIG. 8 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

In accordance with an embodiment, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 686, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 690 (Bayland Urgent Care, BUC) and partition VH-A 692 (Valley Health, VH) can reference one or more resource group templates, by each including a MedRec resource group 693, 694 that references 696, 697 the MedRec resource group template. The reference can then be used to create 702, 706, the virtual targets/virtual hosts for each tenant, including a virtual host baylandurgentcare.com 704 associated with the BUC-A partition, for use by the Bayland Urgent Care tenant; and a virtual host valleyhealth.com 708 associated with the VH-A partition, for use by the Valley Health tenant.

Figure 9:
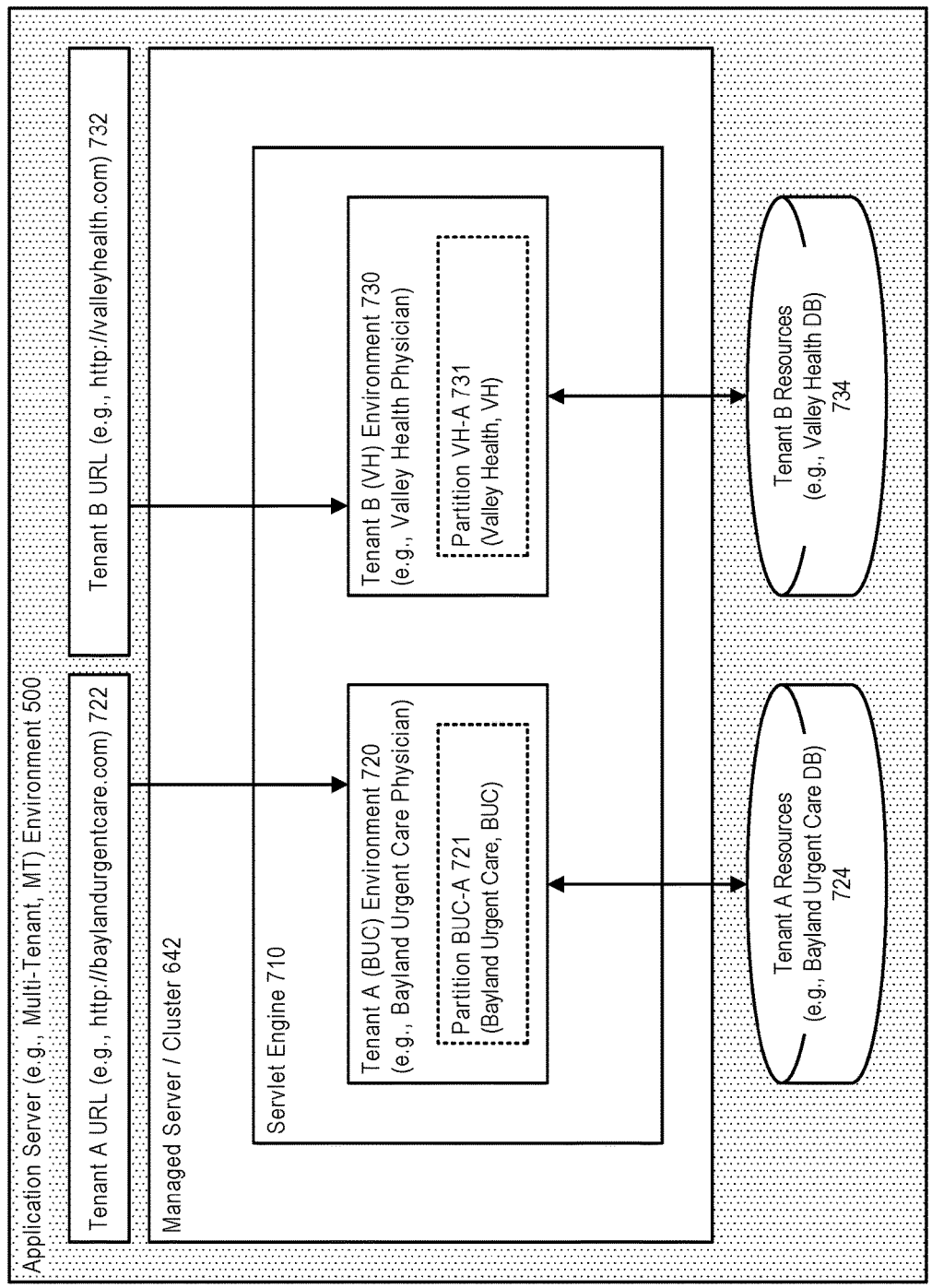
FIG. 9 further illustrates an exemplary multi-tenant environment, in accordance with an embodiment.

FIG. 9 further illustrates an exemplary multi-tenant environment, in accordance with an embodiment. As illustrated in FIG. 9, and continuing the example from above, in which two partitions reference the MedRec resource group template, in accordance with an embodiment, a servlet engine 710 can be used to support a plurality of tenant environments, in this example a Bayland Urgent Care Physician tenant environment 720, and a Valley Health Physician tenant environment 730.

In accordance with an embodiment, each partition 721, 731 can define a different virtual target on which to accept incoming traffic for that tenant environment, and a different URL 722, 732 for connecting to the partition and to its resources 724, 734, including in this example either a bayland urgent care database, or a valley health database respectively. The database instances can use compatible schemas, since the same application code will execute against both databases. When the system starts the partitions, it can create the virtual targets and connection pools to the respective database instances.

In accordance with an embodiment, a shared Java™ EE application instance uses resource proxies to access external resources when needed. Resource proxies can use the application tenancy context of the thread to communicate with a tenant specific resource. Resources can be configured, managed, and monitored on a per-tenant basis. Resource proxies can work for a variety of resources, including, but not limited to, JMS, JDBC, Web Services, etc. It can allow underlying resource to participate in XA transactions and in case of server failure, the transaction recovery can happen using the existing recovery mechanism built into every compliant Java™ EE application server.

In an embodiment of the present disclosure, a method and system for deployment of a multi-tenant application are provided. The system and method can, in an embodiment, provide, at one or more computers, including an application server environment executing thereon, a plurality of deployable resources which can be used within the application server environment, and one or more application deployments, wherein each application deployment includes at least one of tenant-specific code and shared-tenant code. The system and method can further determine an application tenancy context of a thread. The method and system can additionally point to one or more resource proxies, each of the one or more resource proxies being configurable to communicate with a tenant specific resource. Each of the one or more resource proxies can use the application tenancy context of a thread to communicate with a tenant specific resource.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for deployment of an application, comprising:
providing, at one or more computers, including an application server that enables deployment and execution of software applications, wherein the application server is associated with a domain configuration that is used at runtime to define a domain for execution of the software applications,
a plurality of application deployments within the application server, each application deployment being associated with a different tenant of a plurality of tenants, wherein an application deployment of the plurality of application deployments is associated with a tenant of the plurality of tenants, wherein the application deployment of the plurality of application deployments executes on a thread within the application server, and wherein the executing application communicates with a resource proxy;
determining an application tenancy context of the thread, the application tenancy context providing an indication of a tenant specific resource associated with the tenant; and
selecting by the resource proxy, based upon the determined application tenancy context of the thread, at least one tenant specific resource, of a plurality of tenant specific resources, associated with the tenant, wherein the resource proxy, on behalf of the executing application deployment, communicates with the selected at least one tenant specific resource associated with the tenant.

2. The method of claim 1, wherein the resource proxy further selects, based upon the determined application tenancy context, at least one global resource and communicates with the selected at least one global resource on behalf on the executing application deployment.

3. The method of claim 2, wherein a global application is provided, the global application configured to on-board at least one tenant of the plurality of tenants into the application server.

4. The method of claim 3, wherein one or more partitions are provided in the application server, and wherein the executing application deployment comprises an administrative subdivision and a runtime subdivision of a domain for use by the at least one on-boarded tenant.

5. The method of claim 4, wherein each partition is configured to host a different tenant of the plurality of tenants, wherein the global application is further configured to on-board the at least one tenant of the plurality of tenants into a partition of the plurality of partitions, and wherein each application deployment comprises at least one of shared-tenant runtime, tenant scoped runtime, and administrative runtime.

6. The method of claim 1, wherein determining the application tenancy context of the thread is based on at least a current application tenant.

7. The method of claim 1, wherein each of the plurality of application deployments further includes administrative code.

8. A system for deployment of an application, comprising:
one or more computers, including an application server that enables deployment and execution of software applications, wherein the application server is associated with a domain configuration that is used at runtime to define a domain for execution of the software applications; and
a plurality of application deployments within the application server, each application deployment being associated with a different tenant of a plurality of tenants, wherein an application deployment of the plurality of application deployments is associated with a tenant a plurality of tenants, wherein the application deployment of the plurality of application deployments executes on a thread within the application server, and wherein the executing application communicates with a resource proxy;
wherein the system determines an application tenancy context of the thread, the application tenancy context of providing an indication of a tenant specific resource associated with the tenant;
wherein the resource proxy, based upon the determined application tenancy context of the thread, selects at least one tenant specific resource, of a plurality of tenant specific resources, associated with the tenant, and, on behalf of the executing application deployment, communicates with the selected at least one tenant specific resource associated with the tenant.

9. The system of claim 8, wherein the resource proxy further selects, based upon the determined application tenancy context, at least one global resource and communicates with the selected at least one global resource on behalf on the executing application deployment.

10. The system of claim 9, wherein a global application is provided, the global application configured to on-board at least one tenant of the plurality of tenants into the application server.

11. The system of claim 10, wherein one or more partitions are provided in the application server, and wherein the executing application deployment comprises an administrative subdivision and a runtime subdivision of a domain for use by the at least one on-boarded tenant.

12. The system of claim 11, wherein each partition is configured to host a tenant of the plurality of tenants, wherein the global application is further configured to on-board the at least one tenant of the plurality of tenants into a partition of the plurality of partitions, and wherein each application deployment comprises at least one of shared-tenant runtime, tenant scoped runtime, and administrative runtime.

13. The system of claim 11, wherein the system determines the application tenancy context of the thread based on at least a current application tenant.

14. The system of claim 11, wherein each of the plurality of application deployments further includes administrative code.

15. A non-transitory machine readable storage medium having instructions stored there that when executed cause a system to perform the steps comprising:
providing, at one or more computers, including an application server that enables deployment and execution of software applications, wherein the application server is associated with a domain configuration that is used at runtime to define a domain for execution of the software applications,
a plurality of application deployments within the application server, each application deployment being associated with a different tenant of a plurality of tenants, wherein an application deployment of the plurality of application deployments is associated with a tenant of the plurality of tenants, wherein the application deployment of the plurality of application deployments executes on a thread within the application server, and wherein the executing application communicates with a resource proxy;
determining an application tenancy context of the thread, the application tenancy context of providing an indication of a tenant specific resource associated with the tenant; and
selecting by the resource proxy, based upon the determined application tenancy context of the thread, at least one tenant specific resource, of a plurality of tenant specific resources, associated with the tenant, wherein the resource proxy, on behalf of the executing application deployment, communicates with the selected at least one tenant specific resource associated with the tenant.

16. The non-transitory machine readable storage medium of claim 15, wherein the resource proxy further selects, based upon the determined application tenancy context, at least one global resource and communicates with the selected at least one global resource on behalf on the executing application deployment.

17. The non-transitory machine readable storage medium of claim 16, wherein a global application is provided, the global application configured to on-board at least one tenant of the plurality of tenants into the application server.

18. The non-transitory machine readable storage medium of claim 17, wherein one or more partitions are provided in the application server, and wherein the executing application deployment comprises an administrative subdivision and a runtime subdivision of a domain for use by the at least one on-boarded tenant.

19. The non-transitory machine readable storage medium of claim 18, wherein each partition is configured to host a tenant of the plurality of tenants, wherein the global application is further configured to on-board the at least one tenant of the plurality of tenants into a partition of the plurality of partitions, and wherein each application deployment comprises at least one of shared-tenant runtime, tenant scoped runtime, and administrative runtime.

20. The non-transitory machine readable storage medium of claim 15, wherein determining the application tenancy context of the thread is based on at least a current application tenant.

* * * * *

UNITED STATES PATENT AND TRADEMARK OFFICE
CERTIFICATE OF CORRECTION

PATENT NO. : 10,091,135 B2
APPLICATION NO. : 14/973052
DATED : October 2, 2018
INVENTOR(S) : Sahoo et al.

Page 1 of 1

It is certified that error appears in the above-identified patent and that said Letters Patent is hereby corrected as shown below:

In the Specification

In Column 2, Line 34, delete "embodiment" and insert -- embodiment. --, therefor.

In Column 6, Line 51, delete "tenants" and insert -- tenants. --, therefor.

Signed and Sealed this
Fourteenth Day of January, 2020

Andrei Iancu
*Director of the United States Patent and Trademark Office*